United States Patent [19]

Stroz et al.

[11] 4,241,091

[45] Dec. 23, 1980

[54] CALORIE-FREE NON-ADHESIVE CHEWING GUMS AND METHOD

[75] Inventors: John J. Stroz, Monroe, Conn.; Abraham I. Bakal, Parsippany, N.J.; Donald A. M. Mackay, Pleasantville, N.Y.

[73] Assignee: Life Savers, Inc., New York, N.Y.

[21] Appl. No.: 971,757

[22] Filed: Dec. 21, 1978

[51] Int. Cl.$^2$ .............................................. A23G 3/30
[52] U.S. Cl. ........................................ 426/4; 426/548
[58] Field of Search ................................. 426/3-6, 426/548

[56] References Cited

U.S. PATENT DOCUMENTS

| | | | |
|---|---|---|---|
| 1,052,872 | 2/1913 | Williams | 426/5 |
| 1,977,059 | 10/1934 | Hatherell | 426/4 |
| 2,286,712 | 6/1942 | Borglin | 426/6 |
| 2,438,551 | 3/1948 | Fenimore | 426/3 |
| 2,876,106 | 3/1959 | Jucaitis | 426/3 |
| 3,795,744 | 3/1974 | Ogawa et al. | 426/3 |
| 3,826,847 | 7/1974 | Ogawa et al. | 426/3 |
| 3,974,293 | 8/1976 | Witzel | 426/4 |

Primary Examiner—Jeanette M. Hunter
Attorney, Agent, or Firm—Lawrence S. Levinson; Burton Rodney

[57] ABSTRACT

A substantially calorie-free, non-carbohydrate, non-cariogenic, non-adhesive chewing gum is provided which does not adhere to dentures and includes gum base, substantially calorie-free sweetener, flavor, water, thickener, filler, softener and a slip agent for imparting non-adhesive properties to the gum, the slip agent being alpha-cellulose, texturized vegetable protein, fish protein concentrate, citrus peel, citrus pulp, fruit pulp or mixtures thereof. A method for imparting non-adhesive properties to chewing gum is also provided. The resulting chewing gum has significantly higher cud volume than heretofore known chewing gum of equivalent weight.

15 Claims, No Drawings

CALORIE-FREE NON-ADHESIVE CHEWING GUMS AND METHOD

FIELD OF THE INVENTION

The present invention relates to a substantially calorie-free, carbohydrate-free, non-cariogenic chewing gum composition which has a surprisingly large cud volume for its weight and which will not adhere to natural or artificial teeth or prosthetic devices.

BACKGROUND OF THE INVENTION

Chewing gums presently marketed are classified as sugar-containing and sugarless. The sugarless chewing gums include artificial sweeteners and/or sugar alcohols, such as sorbitol, mannitol and/or xylitol, as sugar and corn syrup substitutes. While the sugarless chewing gums may be classified as non-cariogenic, they are not non-caloric. The sugar alcohols have the same caloric content as carbohydrates, thus would not be a recommended item for the truly diet conscious.

The sugar-containing gums contain corn syrup as a softener or plasticizer and sugars such as sucrose, dextrose and/or fructose. These materials, which are carbohydrates, have a caloric value of approximately 4 calories per gm.

Accordingly, there clearly exists a need for a truly calorie-free carbohydrate-free chewing gum.

It has been suggested that a calorie-free gum may be produced by forming a chewing gum from gum base, flavor oil, softener (such as lecithin), spray-dried flavor, and artificial sweetener. Such a product is free of extractable sugar and calorie-containing sugar substitutes and therefore does not provide a fermentable substrate to promote glycolysis in the oral cavity. However, it has been found that such calorie-free gum is hard to chew, has poor texture, and is lacking in initial and subsequent flavor and sweetener release.

The reason that it is hard to chew and has poor texture is that it does not contain the usual soluble bulking agents, such as sugar or sorbitol, which impart necessary sweetness and discontinuity to the gum base upon chewing. Moreover, use of large amounts of softeners or plasticizers only imparts extreme softness to the gum base and not a desirable chew or textural quality.

Another problem encountered in both sugar-containing and sugarless chewing gum is that such gums adhere to artificial teeth and other surfaces. The interface between natural teeth and chewing gum is not one of tooth enamel (calcium phosphate) but rather mucin which is a slippery proteinaceous film covering natural teeth. However, it appears that artificial teeth and dentures, which are usually formed of acrylic polymers, polystyrene, polyvinyl chloride, polyvinyl esters (Luxene), hard rubber (Vulcanite), and the like, do not wet as effectively as natural teeth, and will not readily be coated with mucin. Accordingly, where many chewing gum compositions will not adhere to natural teeth, they will adhere to artificial teeth and dentures.

Various additives for chewing gums have been suggested to reduce or eliminate the problem of chewing gum adhering to dentures and artificial teeth, such as lecithin as disclosed in U.S. Pat. No. 2,197,719, lanolin as disclosed in U.S. Pat. No. 2,197,718 and silicone oils as disclosed in U.S. Pat. No. 2,761,782. U.S. Pat. No. 3,255,018 to Comollo discloses the use of water-soluble hydrolyzable tannin, such as tannic acid or polymeric tannic acid adducts, in combination with type A or B gelatin water-containing hydrophilic polymer gels.

U.S. Pat. No. 1,977,059 to Hatherell discloses a method of making a chewing gum base produced form resin, rubber, and other materials examples of which include fine fibers of a material such as wood or asbestos or cotton or silk. The latter materials are ostensibly present to impart cohesivity to the gum base.

Larger cud volume is a desired characteristic in chewing gums. Accordingly, increasing the cud volume without increasing the gum base is a very desired characteristic in chewing gums for economic and functional reasons. This is expecially true in bubble gum, since small cuds will not allow blowing bubbles.

DESCRIPTION OF THE INVENTION

In accordance with the present invention, a substantially calorie-free, carbohydrate-free, non-cariogenic chewing gum composition is provided which provides less than one calorie per serving and which has an acceptable, soft texture, a pleasant initial flavor and sweetness burst, a long-lasting flavor and sweetness and will not adhere to natural teeth, artificial teeth, filling material, and dental prosthetic devices. The chewing gum of the invention contains a substantially calorie-free gum base (because of insolubility and non-digestability), one or more substantially calorie-free sweeteners, flavors, softeners and wetting agents, lubricants, thickeners, and water, and from about 1 to about 15%, preferably from about 2 to about 15%, and more preferably from about 2 to about 8% by weight (based on the total weight of the chewing gum) of a slip agent or texturizing agent for imparting to and enhancing slip release qualities of the chewing gum so that it will not adhere to denture material, artificial teeth or filling materials.

The chewing gum of the invention may be categorized as non-cariogenic inasmuch as it is substantially free of carbohydrates and other fermentable materials.

The slip agent or texturizing agent employed herein will impart the necessary textural qualities to the gum base normally provided by conventional calorie-containing soluble bulking agents. Thus, the texturizing agent employed will preferably comprise a non-calorie and/or non-digestible material as outlined below which is employed in relatively small amounts (1 to 15% by weight of the gum) as compared to conventional soluble bulking agents, such as sugar or sorbitol which are normally employed at levels of 50–80% by weight of the gum. Thus, even if the slip agent or texturizing agent contains a small amount of calories, it will be used in sufficiently small quantities and/or is incorporated in the gum base in a manner so that it is not readily released so that it will not make a significant contribution to the caloric content of the final chewing gum.

The slip agent or texturizing agent may comprise alpha-cellulose, texturized vegetable protein, fish protein concentrate, bran, citrus peel, cellulose, pectin, citrus pulp, other fruit or vegetable pulp or mixtures thereof. The slip agent will preferably be in particulate form having a particle size ranging from about 500 to about 30 microns, and more preferably from about 100 to about 30 microns.

The chewing gum of the invention includes from about 1 to about 40% and preferably from about 5 to about 30% by weight water. The chewing gum is able to absorb or retain such amounts of water without syneresis due to the presence therein of the texturizing agent, whereas conventional chewing gums containing more than 10% by weight water are undesirable due to water-leakage and stickiness problems.

In addition, a method is provided for imparting non-adhesive properties to chewing gum wherein a texturizing agent or slip agent as defined above is added to the ingredients making up the chewing gum. It is theorized that the texturizing agent absorbs and holds water and thus maintains a thin film of water between the chewing gum and external surfaces and thereby prevents the gum from sticking to such surfaces.

It has also been surprisingly found that the slip agent or texturizing agent absorbs large amounts of water and thus increases the cud volume of the chewing gum from about 5 to about 15% over the same chewing gum without such slip agent. In addition, the presence in the gum of water in an amount ranging from about 1 to about 40% by weight, and preferably from about 5 to about 30% by weight, and/or a thickener, such as carboxymethyl cellulose in an amount within the range of from about 0 to about 3% by weight, and preferably from about 0.2 to about 2% by weight (the water and/or thickener being present in addition to the slip agent), causes the cud volume of the chewing gum to increase from about 8 to about 18% or more over the cud volume of the same chewing gum without the slip agent and water and/or thickener.

It will now be apparent that the presence of the texturizing agent in combination with the high levels of water in the chewing gum of the invention imparts superior and unexpected properties over that obtained from using the texturizing agent alone or high levels of water alone thereby suggesting a synergistic interaction between the water and texturizing agent.

Thickeners which may be employed herein alone or in conjunction with an aqueous softener include methyl cellulose, alginates, carrageenan, xanthan gum, gelatin, carob, tragacanth, locust bean, and other water-soluble gums, and carboxymethyl cellulose, with carboxymethyl cellulose being particularly preferred.

In addition, as mentioned hereinbefore, the chewing gum may include a substantially calorie-free sweetener in an amount required to impart the desired sweetness level, for example, in an amount within the range of from about 0.1 to about 5% by weight, and preferably from about 0.3 to about 3% by weight of the chewing gum, such as poorly water-soluble as well as water-soluble sweeteners, such as the free acid form of saccharin, sodium, calcium or ammonium saccharin salts, dihydrochalcones and salts thereof, glycyrrhizin, glycyrrhizic acid ammonium salt, L-aspartyl-L-phenylalanine methyl ester, as well as *Stevia rebaudiana* (Stevioside), *Richardella dulcifica* (Miracle Berry), *Dioscorephyllum cumminsii* (Serendipity Berry), free cyclamic acid and sodium or calcium cyclamate salts, and the like, or mixtures of any two or more of the above.

Where long-lasting sweetness is desired, the sweetener may be employed in particulate form so as to have an average particle size of less than 150 microns, and preferably less than 100 microns.

The chewing gum of the invention will also contain from about 0.1 to about 10% by weight, and preferably from about 0.1 to about 1% by weight softeners. Examples of softeners suitable for use herein include, but are not limited to, glycerol monostearate, lecithin, coconut oil, fatty acids such as stearic, oleic and palmitic, partially hydrolyzed polyvinyl esters, waxes such as carnauba wax, candelilla wax and beeswax wax, and cellulose derivatives.

The chewing gum may also contain from about 0.1 to about 5% plasticizers. Plasticizers suitable for use herein include, but are not limited to, partially hydrolyzed polyvinyl acetate, carnauba wax, beeswax, cellulose derivatives such as methyl cellulose and carboxy methyl cellulose, flavor oils, limonene derivatives, and various hydrophiles such as propylene glycol and glycerine and combinations of any two or more of the above.

The chewing gum will include a relatively water-insoluble, water-impenetrable, substantially calorie-free gum base in an amount ranging from about 15 to about 80% and preferably from about 20 to 55% by weight of the chewing gum composition.

In general, the gum base is prepared by heating and blending natural gums, synthetic resins, waxes, plasticizers, etc., in a manner well known in the art. Typical examples of the ingredients found in a chewing gum base are masticatory substances of synthetic origin such as styrene-butadiene copolymer, isobutylene-isoprene copolymer, polyisobutylene, polyethylene, petroleum wax, polyvinyl acetate, as well as masticatory substances of natural origin such as rubber latex solids, chicle, crown gum, nispero, rosidinha, jelutong, pendare, perillo, niger gutta, tunu, etc. The elastomer or masticatory substance will be employed in an amount within the range of about 5 to about 15%, preferably from about 8 to about 12%, and optimally from about 9 to about 11% by weight of the gum base composition.

In addition, the gum base will preferably contain a solvent for the elastomer which should have minimal tackifying properties and will preferably comprise hydrogenated ester gum, that is, glycerol ester of hydrogenated rosin and/or dimerized ester gum.

Other conventional ingredients which may be present in the gum base include a hydrophilic-type detackifier which will sorb saliva and become slippery and is incompatible with the elastomer and solvent for the elastomer, such as polyvinyl acetate, polyvinyl butyl ether, copolymers of vinyl esters and vinyl ethers.

The gum base may also include hard waxes which serve as lubricants and should have a melting point of above about 65° C. and preferably above about 75° C. Examples of such hard waxes include candelilla wax, paraffin wax, carnauba wax, ozokerite, oricury, microcrystalline wax, and the like.

The gum base may also include a softening agent and lubricant combination which may comprise one or more hydrogenated vegetable or animal fats having a high melting point, that is above about 22° C.

The gum base will also include an emulsifier to impart hydrophilic properties to the gum base so that saliva will be absorbed, thereby making the gum base slippery. Examples of such emulsifiers include glyceryl monostearate, phosphatides, such as lecithin and cephalin, Tweens, Spans and mixtures thereof.

In addition, the gum base may include colorants such as titanium dioxide, plasticizers, such as lanolin, stearic acid, sodium stearate, potassium stearate and the like, antioxidants, in an amount up to about 1000 ppm of the gum base, such as butylated hydroxytoluene, butylated hydroxyanisole, and/or propyl gallate.

Conventional chewing gum includes a large proportion of plasticizers and softeners which are exemplified by corn syrup and/or sugar alcohols such as sorbitol, mannitol and/or xylitol. In accordance with the present invention, these high calorie components are replaced by substantially calorie-free fillers and texturizing agents which impart the desired softness and texture to the chewing gum.

The fillers and texturizing agents are present in the gum base in amounts ranging from about 10 to about 100% by weight, and preferably from about 10 to about 50% by weight of the gum base portion. Examples of such substantially calorie-free fillers and/or texturizing agents suitable for use herein include, but are not limited to, calcium carbonate, aluminum hydroxide, alumina, magnesium carbonate, talc ($3MgO \cdot 4SiO_2 \cdot H_2O$), aluminum silicates, Cab-O-Sil, and combinations thereof.

In addition, the gum base may be mixed with artificial sweeteners and/or food acids as set out herein to provide initial burst of sweetness or sourness and/or prolongation of sweetness.

The water-insoluble gum base may consist of any of the various bases disclosed for example in U.S. Pat. Nos. 3,052,552 and 2,197,719.

The chewing gum of the invention may include flavoring, such as sour or fruit flavoring or non-acid or mint flavoring in an amount ranging from about 0.3 to about 5.0% by weight, and preferably from about 0.5 to about 2.5% by weight of the final gum product. The flavoring may comprise oils derived from plants, leaves, flowers, fruit, etc. Representative flavor oils of this type include citrus oils such as lemon oil, orange oil, lime oil, grapefruit oil, fruit essences such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruit, may also be incorporated in the chewing gum of the invention with or without conventional preservatives. The above flavors may be added with the aqueous softener to the gum base.

In order to provide an initial taste or sensation of sourness, the chewing gum of the invention may also contain food acid such as citric acid, tartaric acid, malic acid, and the like, in an amount ranging from about 0.3 to about 2.0% by weight, and preferably from about 0.5 to about 1.2% by weight of the final gum product. Such food acid may be added to the gum with the aqueous softener, in order to facilitate initial sourness. In addition, insoluble acids such as fumaric or encapsulated soluble acids may be added and buried in the gum base in order to sustain lasting sourness.

The method for forming the substantially calorie-free chewing gum of the invention includes the steps of mixing melted gum base with the slip agent and a portion of the flavoring and sweetener. The water and thickener and remaining flavor are separately mixed to produce a stable emulsion. The emulsion is added to the gum base with mixing. The remainder of the sweetener is added with mixing. The mixture is cooled to form a chewing gum which is rolled and scored and cut into strips.

It has been found that chewing gum prepared as described has better initial flavor and sweetness burst and long-lasting sweetness and flavor than chewing gums prepared by incorporating the slip agent with the water phase.

The following represents preferred formulations of chewing gum in accordance with the present invention.

| Ingredient | Preferred Parts by Weight Composition Range |
|---|---|
| Gum base | 30–50 |
| Filler (present in gum base) | 10–30 |
| Water | 5–30 |
| Thickener | 0.5–2 |
| Slip agent | 2–15 |
| Softener (Lecithin) | 0–1 |
| Flavor oil | 1–3 |
| Sweetener | 0–5 |

It will also be appreciated that the chewing gum of the invention which preferably contains from 10 to 30% by weight water may be employed as a carrier for medicaments, breath deodorizers, or other therapeutic agents which may be released in the oral cavity upon chewing.

The following Examples represent preferred embodiments of the present invention.

EXAMPLES 1 TO 6

Chewing gums are prepared according to the basic compositions given in Table I. The chewing gums are prepared by melting the gum base in a kettle followed by cooling to 180° F. To the gum base, the talc is added with mixing for 2–3 minutes. The lecithin and the wood pulp are added and mixed. One-half of the flavor and sweetener are added to the mix and mixed thoroughly for 5 minutes. The water, carboxymethyl cellulose, lecithin, and remaining flavor are mixed to produce a uniform, stable emulsion. The emulsion is added to the gum base mix with mixing for 3 to 5 minutes. The remaining sweetener and other ingredients are added with mixing. The product is removed from the kettle, rolled and scored.

TABLE I

| | Parts by Weight | | | | | |
|---|---|---|---|---|---|---|
| Example No. | 1 | 2 | 3 | 4 | 5 | 6 |
| Ingredient | | | | | | |
| Gum base | 40 | 40 | 40 | 40 | 37 | 40 |
| $H_2O$ | 29 | 25 | 29 | 25 | 30 | 30 |
| Carboxymethyl cellulose | 1 | 1 | 1 | 1 | 1 | 1.8 |
| Wood pulp (Keycel BH-200) | 12 | 1 | 12 | 12 | 12 | 5 |
| Talc | 15 | 15 | 15 | 15 | 15 | 20.2 |
| Lecithin | 0.2 | 0.2 | 0.2 | 0.2 | 0.2 | 0.2 |
| Flavor oil | 3 | 3 | 3 | 3 | 3 | 2.5 |
| Aspartame | 0.15 | 0.15 | 0.15 | 0.15 | 0.15 | 0.3 |
| Glycerine | 1 | 5 | — | — | — | — |
| Propylene glycol USP | — | — | 1 | 5 | — | — |
| Limonene | — | — | — | — | 1.2 | — |

The chewing gums of Examples 1 to 6 are found to have a soft initial texture which continues to be pleasant upon chewing, an acceptable, pleasant initial flavor and sweetness burst, a flavor and sweetness that lasts for more than 15 minutes, are non-sticking, and have a high cud volume for their weight.

EXAMPLES 7 TO 9

Chewing gums are prepared according to the procedure outlined in Example 6 except that chalk is employed as a filler instead of talc, and saccharin is employed in Examples 7 and 8 in place of aspartame.

The chewing gum formulations obtained are shown in Table II below.

TABLE II

| Example No. | Parts by Weight | | |
|---|---|---|---|
| | 7 | 8 | 9 |
| Ingredient | | | |
| Chalkless gum base | 30 | 34 | 31 |
| Chalk | 30 | 22 | 30 |
| Talc | — | — | — |
| Lecithin | 0.2 | 0.2 | 0.2 |
| Water | 30 | 30 | 25 |
| CMC | 2 | 1.2 | 1 |
| Flavor oil | 2.5 | 2.5 | 2.5 |
| Wood pulp (Keycel BH-200) | 5 | 10 | 15 |
| Saccharin | 0.2 | 0.2 | — |
| Aspartame | — | — | 0.3 |

The chewing gums of Examples 7, 8 and 9 are found to be fairly comparable to the chewing gums of Examples 1 to 6 in texture, softness, flavor and sweetness release, cud volume, and non-stick properties.

EXAMPLES 10 TO 12

Chewing gums are prepared according to the procedure outlined in Examples 7 and 8 except that bran (ground and sifted through a No. 40 sieve) is employed in place of wood pulp as the slip agent.

The chewing gum formulations obtained are shown in Table III below.

TABLE III

| Example No. | Parts by Weight | | |
|---|---|---|---|
| | 10 | 11 | 12 |
| Ingredient | | | |
| Chalkless gum base | 35 | 30 | 30 |
| Chalk | 35 | 25 | 30 |
| Lecithin | 0.2 | 0.2 | 0.2 |
| Carboxymethyl cellulose | 1.2 | 1.2 | 2 |
| Water | 20 | 20 | 30 |
| Flavor oil | 2.5 | 2.5 | 2.5 |
| Bran | 6 | 21 | 5.4 |
| Saccharin | 0.1 | 0.1 | 0.1 |

The chewing gums obtained in Examples 10 to 12 are found to have acceptable softness, acceptable flavor and sweetness release, increased cud volumes and reduced gum stickiness to surfaces as compared to similar chewing gum formulations without the bran.

EXAMPLES 13 TO 15

Chewing gums are prepared according to the procedure outlined in Example 6, except that dried orange peel is employed in place of wood pulp as the slip agent and saccharin is employed as a sweetener in place of aspartame.

The chewing gum formulations obtained are shown in Table IV below.

TABLE IV

| Example No. | Parts by Weight | | |
|---|---|---|---|
| | 13 | 14 | 15 |
| Ingredient | | | |
| Chalkless gum base | 36 | 34 | 29 |
| Talc | 35 | 30 | 25 |
| Lecithin | 0.2 | 0.2 | 0.2 |
| Water | 20 | 25 | 30 |
| Carboxymethyl cellulose | 1 | 1.2 | 2 |
| Flavor oil | 2.5 | 2.5 | 2.5 |
| Orange peel | 5 | 7 | 11 |

TABLE IV-continued

| Example No. | Parts by Weight | | |
|---|---|---|---|
| | 13 | 14 | 15 |
| Saccharin | 0.2 | 0.2 | 0.2 |

The chewing gums obtained in Examples 13 to 15 have acceptable softness, acceptable flavor and sweetener release, increased cud volumes, and reduced gum stickiness to surfaces as compared to similar chewing gums without the orange peel.

EXAMPLES 16 TO 18

Chewing gums are prepared according to the procedure outlined in Example 6 except that texturized vegetable protein is employed in place of wood pulp as the slip agent and sweetener is omitted.

The chewing gum formulations obtained are shown in Table V below.

TABLE V

| Example No. | Parts by Weight | | |
|---|---|---|---|
| | 16 | 17 | 18 |
| Ingredient | | | |
| Chalkless gum base | 42 | 30 | 31 |
| Talc | 29 | 20.5 | 30 |
| Lecithin | 0.2 | 0.2 | 0.2 |
| Water | 20 | 30 | 25 |
| Carboxymethyl cellulose | 1.2 | 2 | 1.6 |
| Flavor oil | 2.5 | 2.5 | 2.5 |
| Texturized vegetable protein | 5 | 15 | 10 |

The chewing gum obtained is found to be comparable in properties to the chewing gums of Examples 13 to 15. The preferred formulation contains 5% texturized vegetable protein.

What is claimed is:

1. A substantially calorie-free carbohydrate-free, non-cariogenic chewing gum having non-adhesive properties consisting essentially of gum base, a substantially calorie-free sweetener, flavoring, filler, from about 1 to about 15% by weight of alpha-cellulose as a non-adhesive-imparting slip agent or texturizing agent and bulking agent, and from about 1 to about 40% by weight water, to improve chewing quality, impart non-adhesive properties to said gum and increase cud size of said gum.

2. The chewing gum as defined in claim 1 wherein said alpha-cellulose is in particulate form having an average particle size within the range of from about 500 to about 30 microns.

3. The chewing gum as defined in claim 1 wherein said chewing gum comprises from about 5 to about 30% by weight water.

4. The chewing gum as defined in claim 1 further including carboxymethyl cellulose.

5. The chewing gum as defined in claim 1 further including from about 0.2 to about 3% by weight of a thickener comprising methyl cellulose, alginates, carrageenan, xanthan gum, gelatin, carob, tragacanth, locust bean, or carboxymethyl cellulose.

6. The chewing gum as defined in claim 1 wherein said water comprises from about 10 to about 30% by weight of said gum.

7. The chewing gum as defined in claim 1 wherein said water is present in an amount of from about 10 to about 30% by weight, and said chewing gum further includes from about 0.2 to about 3% by weight carboxymethyl cellulose.

8. The chewing gum as defined in claim 1 wherein said chewing gum includes from about 15 to about 30% by weight water.

9. The chewing gum as defined in claim 1 further including from about 0.5 to about 10% by weight of a substantially calorie-free softener.

10. The chewing gum as defined in claim 1 wherein said filler or texturizing agent is selected from the group consisting of calcium carbonate, aluminum hydroxide, alumina, magnesium carbonate, talc, aluminum silicates, and mixtures thereof.

11. The chewing gum as defined in claim 10 wherein said filler or texturizing agent is calcium carbonate or talc or mixtures thereof.

12. The chewing gum as defined in claim 9 wherein said softener is selected from the group consisting of lecithin, coconut oil, fatty acids, glycerol stearate, polyvinyl alcohol, cellulose derivatives and mixtures thereof.

13. The chewing gum as defined in claim 1 wherein said sweetener is selected from the group consisting of sodium saccharin, calcium saccharin, ammonium saccharin, the free acid form of saccharin, sodium cyclamate, calcium cyclamate, free cyclamic acid, dihydrochalcones or salts thereof, glycyrrhizin, glycyrrhizic acid ammonium salt, L-aspartyl-L-phenylalanine methyl ester and mixtures thereof.

14. A method for forming a calorie-free non-adhesive chewing gum said chewing gum consisting essentially of gum base, water, thickener, sweetener and flavor, and from about 1 to about 15% by weight of alpha-cellulose, which comprises mixing melted gum base, alpha-cellulose and optionally flavor and sweetener to form a gum base mixture, separately mixing water, thickener and remaining flavor and sweetener to form an emulsion and mixing said gum base mixture and emulsion, and cooling the mix to form a chewing gum, said thickener being present in an amount of from about 0.2 to about 1.5% by weight all of said % being based on the weight of said final chewing gum.

15. The method as defined in claim 14 wherein said chewing gum comprises from about 10 to about 30% by weight water, and from about 0.2 to about 1.5% by weight carboxymethyl cellulose, said % being based on the total weight of said chewing gum.

* * * * *